(No Model.) 2 Sheets—Sheet 1.
T. SCHROEDER.
ADJUSTABLE ODOMETER.
No. 519,592. Patented May 8, 1894.
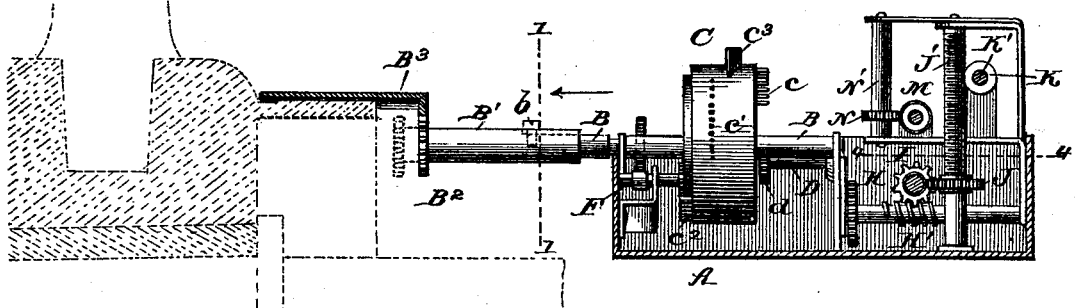
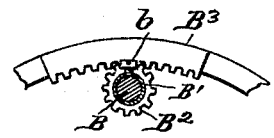
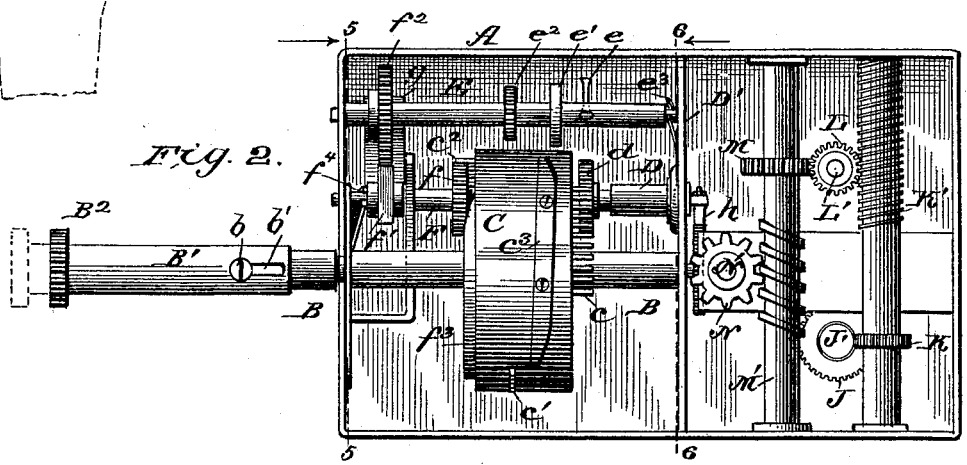
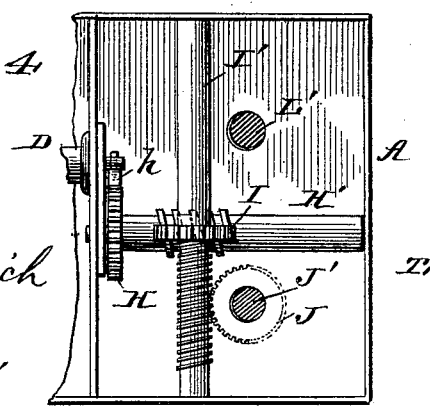
WITNESSES:
Fred G. Dieterich
Edw. W. Byrn
INVENTOR
Theodor Schroeder
BY Munn & Co.
ATTORNEYS.

(No Model.) 2 Sheets—Sheet 2.

T. SCHROEDER.
ADJUSTABLE ODOMETER.

No. 519,592. Patented May 8, 1894.

WITNESSES:
Fred G. Dieterich
Edw. W. Byrn

INVENTOR
Theodor Schroeder
BY Munn & Co
ATTORNEYS.

THE NATIONAL LITHOGRAPHING COMPANY,
WASHINGTON, D. C.

UNITED STATES PATENT OFFICE.

THEODOR SCHROEDER, OF NEW PRAGUE, MINNESOTA.

ADJUSTABLE ODOMETER.

SPECIFICATION forming part of Letters Patent No. 519,592, dated May 8, 1894.

Application filed August 1, 1893. Serial No. 482,092. (No model.)

*To all whom it may concern:*

Be it known that I, THEODOR SCHROEDER, of New Prague, in the county of Scott and State of Minnesota, have invented a new and useful Improvement in Odometers, of which the following is a specification.

The object of my invention is to provide an odometer attachment for carriages, for the use of livery keepers, surveyors, and civil engineers, which shall indicate the number of miles traveled by the carriage in an automatic, reliable, and accurate manner. Attachments of this kind designed to be operated by the revolution of one of the wheels have heretofore been devised, but as the circumference of the wheel is a variable factor, dependent upon the size of the wheel, which differs in different vehicles, this method is not exact, and requires special computation.

My device is intended to be applicable to wheels of all vehicles independent of their size, and still secure upon the register an exact measurement record in units of a single denomination. For this purpose my device is adjustable to the size of the wheel, analyzing its circumference into so many feet, inches, and fractions of an inch, and then at each revolution transferring these feet, inches, and fractions to different gears, to be in turn assembled and recorded in a cumulative way upon the register of the odometer in miles as will be hereinafter more fully described with reference to the drawings, in which—

Figure 5:
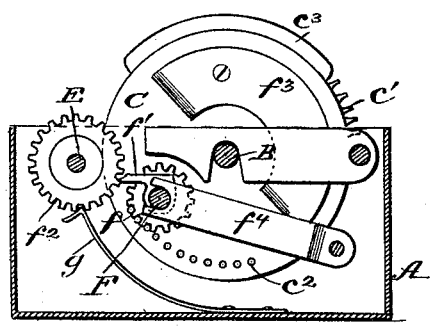
Figure 6:
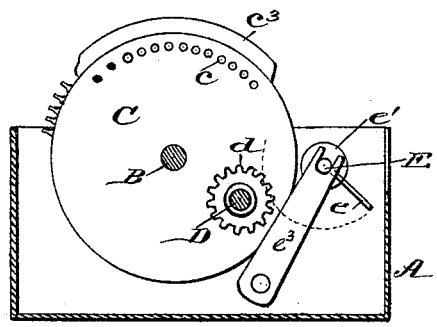
Figure 9:
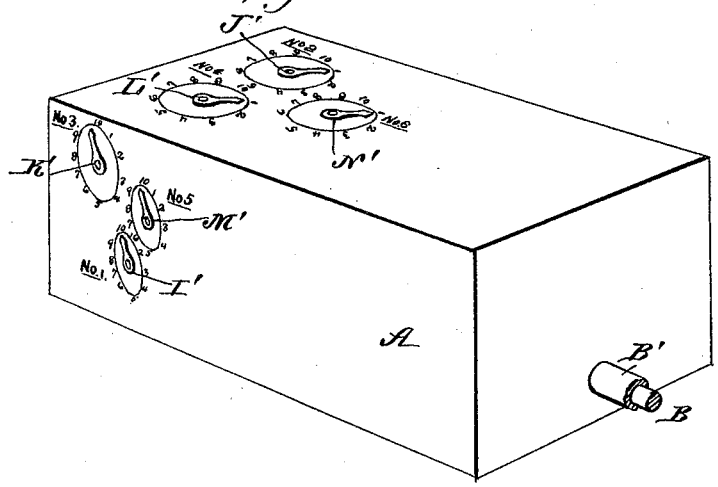
Figure 7:
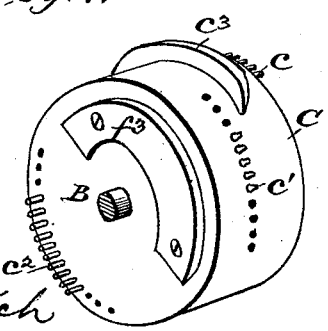
Figure 8:

Figure 1 is a vertical longitudinal section, showing the working parts of the device applied to the hub of a wheel. Fig. 2 is a plan view on a larger scale. Fig. 3 is a section through line 1—1 of Fig. 1, looking in the direction of the arrow. Fig. 4 is a horizontal section of the register gears taken through line 4—4 of Fig. 1. Fig. 5 is a section through line 5—5 of Fig. 2. Fig. 6 is a section through line 6—6 of Fig. 2. Fig. 7 is a detail in perspective of the drum on the main shaft. Fig. 8 is a sectional detail showing the adjustable teeth on the drum, and Fig. 9 is a perspective view of the exterior of the case showing the registers and index hands.

In the drawings A represents the case of the odometer, which may be made in any suitable manner consistent with strength and compactness. This case is designed to be supported upon one of the axles of the vehicle near the inner edge of the hub of one of the wheels, see Fig. 1, the case being firmly but detachably connected to the axle in any approved manner, by clips and bolts for instance, so that it cannot become accidentally detached. Within the case is journaled in horizontal position a main shaft B whose end next to the hub protrudes through the case and is provided with a sliding or telescopic sleeve B' carrying at its outer end a small gear wheel or pinion $B^2$. This gear is arranged to be engaged by a segmental toothed flange $B^3$ which is screwed to the hub of the wheel, Figs. 1 and 3, and the teeth of which segmental flange exactly correspond in number to the number of teeth in the pinion $B^2$, so that every time said toothed flange passes the pinion in gear therewith it rotates the pinion one whole revolution. It will therefore be seen that each revolution of the wheel, partly shown in dotted lines, causes the shaft B to make one revolution. The sleeve B' is adjustable longitudinally on shaft B by means of a slot $b'$ and set screw $b$, so as to be projected to cause pinion $B^2$ to engage the toothed flange as it revolves with the wheel as shown in Fig. 1, or be adjusted to a position shown in dotted lines, where it does not so engage the toothed flange when the odometer is not in use. By tightening up the set screw the adjustable sleeve may be held in either of these positions according to whether or not it is desired to have the odometer make a record of the distance traveled.

Upon the main shaft B there is rigidly attached a drum or hub C which is equipped with three sets of adjustable teeth, see Fig. 1. One set of teeth $c$, projects from the side of the drum to the right, another set $c'$ projects from the periphery of the drum, and the other set $c^2$ projects from the side of the drum to the left. The first set $c$ is designed to record the number of feet contained in the circumference of the wheel to which the instrument is applied, the second set $c'$ the number of inches in the fractional part of a foot over and above the whole number of feet in the circumference of said wheel, and the third set $c^2$ the fractions of an inch in sixteenths over and above the whole number of inches in said circumference.

As the wheels of different vehicles vary in size it will be obvious that the number of feet, inches and sixteenths of an inch will vary and necessitate a greater or less number of teeth in each of the sets $c\ c'\ c^2$. For this purpose these teeth are made with screw stems, see Fig. 8, which permit the teeth to be turned entirely into the drum so that they do not project at all, or at least not into range of active work, but may be screwed out at will, see Fig. 7, in numbers sufficient to correspond with the feet, inches, and sixteenths of an inch in the circumference of the wheel. Thus if the circumference of the wheel be eleven feet, five inches, and ten sixteenths of an inch, then the teeth $c$ are adjusted so that only eleven protrude, the teeth $c'$ are adjusted so that five protrude, and the teeth $c^2$ are adjusted so that ten protrude. Thus these sets of teeth are adjusted to any size of wheel, so that when the wheel makes one complete revolution its feet, inches, and sixteenths will be transferred and recorded by these separate sets of teeth through different gears, which finally assemble them in units of a single denomination and record them as follows:

D Fig. 2, is a short horizontal shaft journaled in the partition D', and having a small gear wheel $d$ each of whose teeth represent one foot and are engaged by the set of teeth $c$ of the drum.

E is a counter shaft journaled in the case and partition D', and through which shaft the inches and fractions of an inch are transferred to the wheel $d$ in feet by an arm $e$ which moves the wheel $d$ one tooth every time shaft E revolves. This shaft E bears a rigid disk $e'$, and a gear wheel $e^2$ having twelve teeth, and each of whose teeth represent an inch, so that an entire revolution of shaft E represents a foot. This wheel $e^2$ of twelve teeth is in the plane of the second set of teeth $c'$ of the drum representing inches, and as many teeth of this set $c'$ as are projecting turn the gear $e^2$ so many teeth at each revolution of the vehicle wheel, and when this gear $e^2$ shall have been repeatedly so turned until the fraction of a foot in inches on the drum shall rotate shaft E a complete revolution, then that foot thus accumulated will be transferred through arm $e$ to the wheel $d$. To prevent the arm $e$ from locking wheel $d$ while the set of teeth $c$ is acting upon the latter, the arm $e$ is thrown out of the plane of the wheel $d$, when the teeth $c$ are acting upon the wheel $d$, by means of a peripheral cam $c^3$ on the drum, which bears against the disk $e'$ and throws the shaft E longitudinally against a spring $e^3$—thus removing arm $e$ from wheel $d$ while teeth $c$ are acting upon the same.

To transfer the fractions of an inch in sixteenths from the teeth $c^2$ to shaft E, a short shaft F is journaled in a bracket in the case, Figs. 2 and 5, and is provided with a gear wheel $f$ whose periphery is divided into sixteen teeth. This gear wheel $f$ is arranged to be operated upon by the set of teeth $c^2$ of the drum whenever they pass the same, and every complete revolution of this shaft F and wheel $f$ represents one inch, and is made to rotate the shaft E and its gear $e^2$ one twelfth of a revolution. This is effected by a tappet arm $f'$ on shaft F, which at every revolution of shaft F engages a large gear wheel $f^2$ on shaft E, and rotates the latter one twelfth of a revolution, so that when the drum in its repeated revolution causes its teeth $c^2$ to rotate gear wheel $f$ one complete revolution, the tappet arm $f'$ will through wheel $f^2$ rotate shaft E one twelfth of a revolution, representing one inch, so that the fractions of an inch will be transferred to shaft E in full inches, to be in turn raised to a higher denomination and transferred in feet as before described. A drag pawl or brake $g$, Fig. 5, serves to hold wheel $f^2$ against accidental motion. To prevent the tappet arm $f'$ from locking wheel $f^2$ and shaft E while the set of teeth $c'$ are acting upon the said shaft, a cam $f^3$ on the side of the drum is placed opposite the teeth $c'$, and this cam acts upon the end of shaft F and forces it longitudinally against a spring $f^4$, Figs. 2 and 5, so that tappet arm $f'$ is out of the plane of wheel $f^2$ whenever the teeth $c'$ of the drum are acting upon the gear wheel $e^2$ of shaft E. The feet, inches, and fractions of an inch being thus transferred to the shaft D in single units of one foot, these feet are reduced to miles by the following diminishing gears. On the end of shaft D there is fixed an arm $h$, Figs. 2 and 4 which at every revolution acts upon a toothed wheel H on a worm shaft H' whose worm wheel engages the worm wheel I of a horizontal worm shaft I' which protrudes through the case, Figs. 4 and 9, and is provided with an index hand and dial, marked No. 1, which registers from one-eighth to one mile. The worm of shaft I', Figs. 1, 2, and 4, engages another worm wheel J of a vertical worm shaft J' whose end protrudes through the top of the case and is provided with an index hand and dial, marked No. 2, which registers from one to ten miles. The worm of shaft J' engages a worm wheel K of a horizontal worm shaft K' whose end protrudes through the side of the case, and is provided with an index hand and dial, marked No. 3, which registers from ten to one hundred miles. The worm of shaft K' in turn engages a worm wheel L of a vertical worm shaft L', whose end protrudes through the top of the case and is provided with an index hand and dial, marked No. 4, which registers from one hundred to one thousand miles. The worm of shaft L' engages a worm wheel M on a horizontal shaft M', whose end protrudes through the side of the case, and is provided with an index hand and dial, that is marked No. 5, and registers from one thousand to ten thousand miles. The worm of shaft M' engages a worm wheel N on a vertical shaft N' whose end protrudes through the top of the case, and is provided with an index hand and dial, marked No. 6, which registers from ten thousand to one hundred thousand miles.

I have shown this register carried out to six dials to illustrate how this may be done in a very small compass with the worm shafts compactly arranged alternately at right angles, to provide for a maximum mileage, but in some cases it may not be necessary to use more than half the number of shafts and dials.

By means of this device it will be seen that the livery stable keeper or owner of the vehicle may obtain an accurate record of the distance traveled by his team on any one trip by simply adjusting and applying the odometer to any size of wheel, and the same device affords an accurate and portable instrument at small cost, for the use of surveyors and engineers in making long distance measurements.

Having thus described my invention, what I claim as new, and desire to secure by Letters Patent, is—

1. An odometer attachment to vehicles having an analytical transferring gear for taking off the revolutions of the vehicle wheels in its circumferential subdivisions of feet, inches, &c., and assembling and recording these variable units of measurement in a cumulative way into units of a single denomination substantially as shown and described.

2. The combination of an odometer attachment to vehicles having main shaft B, the slotted and adjustable sleeve B' with set screw and gear wheel $B^2$, and the segmental toothed plate $B^3$ adapted to be secured to the hub of the vehicle wheel substantially as shown and described.

3. An odometer attachment for vehicles having a main shaft arranged to be geared to the hub of the vehicle wheel, a set of recording dials and index hands, and a transferring gear having one set of teeth to transfer the feet in the circumference of the wheel, another set to transfer the inches, and another set to transfer the fractions of inches, substantially as shown and described.

4. In an odometer attachment to vehicle wheels an analytical transferring gear having different sets of teeth for transferring the different units of measurements in the circumference of the wheel the said teeth being made adjustable to bring a greater or less number of them into operation according to the size of the wheel substantially as shown and described.

5. In an odometer attachment to vehicle wheels, an analytical transferring gear having different sets of teeth for transferring the different units of measurements in the circumference of the wheel, gears for receiving these different units of measurements and cams for throwing these gears out of position so that only one can be operated at a time substantially as shown and described.

6. The shaft B with drum C having the three sets of adjustable teeth $c\,c'\,c^2$ and cams $c^3\,f^3$, the shaft D with gear wheel $d$, the longitudinally adjustable counter shaft E having arm $e$, disk $e'$ gear wheel $e^2$ and large gear $f^2$, longitudinally adjustable shaft F having gear $f$ and tappet arm $f'$, and the registering devices all combined substantially as shown and described.

THEODOR SCHROEDER.

Witnesses:
JOHN PROSHEK,
N. T. HAUZAL.